United States Patent
Kotze

(12) 
(10) Patent No.: US 6,589,900 B1
(45) Date of Patent: Jul. 8, 2003

(54) CERAMIC PRODUCT BASED ON LITHIUM ALUMINUM SILICATE

(75) Inventor: Dirk A. Kotze, Natal (ZA)

(73) Assignee: Dakot CC (ZA)

( * ) Notice: Subject to any disclaimer, the term of this patent is extended or adjusted under 35 U.S.C. 154(b) by 0 days.

(21) Appl. No.: 09/787,366

(22) PCT Filed: Sep. 17, 1999

(86) PCT No.: PCT/ZA99/00095

§ 371 (c)(1),
(2), (4) Date: Apr. 23, 2001

(87) PCT Pub. No.: WO00/17127

PCT Pub. Date: Mar. 3, 2000

(30) Foreign Application Priority Data

Sep. 18, 1998 (ZA) ................................................ 98/8560
Feb. 23, 1999 (ZA) ................................................ 99/1435

(51) Int. Cl.⁷ ................................................ C04B 35/19
(52) U.S. Cl. ...................... 501/128; 106/38.3; 106/38.9; 427/226; 427/343
(58) Field of Search ..................... 501/7, 128; 106/38.3, 106/38.9; 427/226, 343

(56) References Cited

U.S. PATENT DOCUMENTS

| 4,126,474 A | * | 11/1978 | Talley et al. ................. 501/125 |
| 5,320,792 A | * | 6/1994 | Wu et al. ....................... 501/3 |
| 6,008,152 A | * | 12/1999 | Guillo et al. .................. 501/54 |

FOREIGN PATENT DOCUMENTS

| JP | 55-067563 | * | 5/1980 |
| JP | 9-30860 | * | 2/1997 |
| JP | 09030860 | * | 2/1997 |

* cited by examiner

Primary Examiner—Karl Group
(74) Attorney, Agent, or Firm—Nixon & Vanderhye PC

(57) ABSTRACT

A ceramic product containing at least 70% lithium aluminium silicate of 100% total mass weight percent; and a non-wetting agent in the form of barium sulphate. Most preferably, the lithium aluminium silicate includes petalite in finely divided form which has been fired to a temperature between 1150° C. and 1210° C.

13 Claims, No Drawings

CERAMIC PRODUCT BASED ON LITHIUM ALUMINUM SILICATE

TECHNICAL FIELD

This invention relates to a ceramic product, and then particularly one for handling molten aluminium. In this specification the term 'ceramic product' refers to a product which has been formed by firing a ceramic raw material to a suitable temperature.

BACKGROUND ART

Molten aluminium, which has a relatively low melting point of approximately 700° C., is difficult to handle and for this reason the apparatus used usually comprises a product that has a high thermal shock resistance, a high resistance to weftability, a low thermal conductivity/capacity, and high strength.

None of the products which has hitherto been used for the aforesaid purpose, amongst others aluminium titanate; fused silica; cast iron and fibrous ceramic board, has ideal properties in this regard.

OBJECT OF THE INVENTION

It is an object of this invention to provide a ceramic product which the applicant believes has advantages over the known arrangements.

DISCLOSURE OF THE INVENTION

According to the invention a ceramic product is provided which contains at least 70% lithium aluminium silicate on a mass per mass basis.

Lithium aluminium silicate (hereafter referred to as LAS) occurs naturally as the mineral petalite, and is used in small quantities in ceramic formulations instead of feldspar in order to decrease the thermal expansion of such formulations, and hence improve their resistance to thermal shock. It is also used in glass compositions for stove tops and oven ware.

Applicant has now found that an LAS-ceramic product according to the invention has extremely low thermal expansion and can hence as such be used in any apparatus subjected to any form of heat exposure, such as for example, that occurring in the handling of molten aluminium.

Such an LAS-ceramic product can be manufactured by forming a suitable quantity of finely divided petalite in any of the conventional methods such as slip casting; extrusion or injection moulding; and wet or dry pressing and then firing it at a temperature in the order of between 1150° C. and 1210° C.

For use in the aluminium industry, such an LAS-ceramic product does not have to be fired to full density. It has been found that fired densities of the order of 60 to 70% of the theoretical are obtained when firing at between 1150 and 1210° C. At these densities, the product shows no dimensional changes, no thermal expansion, adequate strength, a low thermal conductivity and thermal capacity, and also takes an excellent coating when painted with protective materials such as boron nitride, as is normal practice in the aluminium industry. It can furthermore be impregnated with liquid substances intended for enhancing the metallurgical properties of the product.

If required, the density of the LAS-ceramic product can be lowered by the addition of fly ash microspheres and/or a suitable combustible material.

Further according to the invention the LAS-ceramic product according to the invention includes a non-wetting agent which has been incorporated in the fired LAS-ceramic product.

The reason for such incorporation is that the inherent wettability of LAS by molten aluminium poses severe problems when the protective coating usually provided on the LAS-ceramic product is removed, which may, for example, happen during use of the ceramic product.

It has furthermore been found that such wettability cannot be reduced by the incorporation of known non-wetting agents in the ceramic formulation of the product according to the invention, because such agents tend to react with the LAS during the firing process causing them to lose their ability as non-wetting agents.

Furthermore, by incorporating the non-wetting agent in the fired LAS-ceramic product, the thermal expansion properties of the ceramic product are not adversely affected.

Further according to the invention the non-wetting agent comprises barium sulphate ($BaSO_4$), which is a well known non-wetting agent in the ceramic industry.

Further according to the invention a method for improving the non-wettability of an LAS-ceramic product is provided which includes the step of providing a suitable non-wetting agent such as $BaSO_4$ in the fired LAS-ceramic product.

In one form of the invention the $BaSO_4$ may be provided in the fired LAS-ceramic product by impregnating the semi-porous fired LAS-ceramic product with a saturated aqueous solution of barium sulphide (BaS) which, after drying, is oxidised in situ to $BaSO_4$.

Such oxidation may be effected by calcining the dried product to 500–800° C. in an oxidising atmosphere.

Commercial BaS can be used, or BaS can be prepared by the reduction of $BaSO_4$ with carbon at 1190° C., or with ammonia at 1000° C.

In another form of the invention the $BaSO_4$ may be provided by impregnating the semi-porous fired LAS-ceramic product with a solution of $BaCl_2$, and then treating the product with sulphuric acid to cause $BaSO_4$ to precipitate inside the pores of the ceramic product.

Preferably the $BaCl_2$-solution is a substantially saturated one, and the sulphuric acid comprises diluted sulphuric acid.

The $BaCl_2$—solution can either be prepared by dissolving $BaCl_2$ in water, or by treating $BaCO_3$ with hydrochloric acid.

In a preferred form of the invention the ceramic product according to the invention comprises substantially 100% LAS (mass per mass).

BEST MODE FOR CARRYING OUT THE INVENTION

A semi-porous LAS-ceramic product according to the invention comprising 100% (mass per mass) LAS is provided by forming a suitable quantity of petalite in finely divided form by means of any one of the conventional methods such as slip casting; extrusion of injection moulding; or wet or dry pressing, and firing the formed product at a temperature of between 1150° C. and 1210° C.

Preferably said finely divided petalite comprises a mixture of two fractions:

a first one having an average particle size in the order of 1 micrometer, used in a concentration from 50 to 100% (mass per mass); and a second one having a particle size finer than 75 micrometer, used in a concentration of from 0–50% (mass per mass).

The non-wettability of said LAS-ceramic product is improved according to the invention by incorporating $BaSO_4$ as non-wetting agent in the product in any one of the following two methods:

BaS—Impregnation (i) A solution of BaS is prepared by intimately mixing one mass part of $BaSO_4$ with half a mass part of carbon, and firing the mixture at 1190° C. for 2 hours;

(ii) One mass part of the product of step (i) is added to four mass parts water; boiled for 12 hours; and the solids filtered off;

(iii) The solution resulting from step (ii) is kept at boiling point, and the semi-porous LAS-ceramic product immersed in the boiling solution for 15 minutes;

(iv) The impregnated product is air-dried and then calcined at 500–800° C. for 3 hours.

2. $BaCl_2$—Impregnation (i) A saturated solution of $BaCl_2$ is prepared by dissolving 59 g $BaCl_2$ in 100 ml $H_2O$ at 100° C. (Alternatively 1 kg $BaCO_3$ in 0.95 kg $H_2O$ is treated with 1.11 kg HCl (33% concentration by volume) to form a saturated solution of $BaCl_2$);

(ii) A diluted solution of $H_2SO_4$ (concentration not critical, say 50% (volume by volume) is prepared;

(iii) A cooled down semi-porous as fired LAS-ceramic product is impregnated with the boiling $BaCl_2$—solution;

(iv) The ceramic product is cooled down to cause $BaCl_2$ to precipitate out in the pores of the ceramic product;

(v) Any excess water is removed from the ceramic product under vacuum;

(vi) The ceramic body is impregnated with the diluted $H_2SO_4$ which reacts with the $BaCl_2$ to cause $BaSO_4$ to precipitate inside the pores of the ceramic product;

(vii) The ceramic product is dried and calcined to 700° C. to remove all volatiles.

In both instances an LAS-ceramic product is formed which is substantially non-wettable with molten aluminium.

It will be appreciated that the invention also includes within its scope an LAS-ceramic product of which the non-wettability has been improved by the incorporation therein of $BaSO_4$ by any one of the aforesaid two methods.

Results Obtained with a Product According to the Invention

The following results were obtained comparing an LAS-ceramic product according to the invention with products conventionally used in the handling of molten aluminium.

In compiling these results, the importance to the process of the relevant refractory property is rated from 1–10, and then multiplied by the rating (1–10) of the specific ceramic material in terms of the property, in order to generate a normalised rank for the different materials in terms of their total performance.

| 1. Competitive products | |
|---|---|
| Aluminium Titanate | (AT) |
| Fused Silica | (FS) |
| Cast Iron | (CI) |
| Fibrous Ceramic Board | (CB) |
| Ceramic LAS-Product | (LAS) |

-continued

| 2. Weighted properties | |
|---|---|
| Thermal Shock Resistance | (10) |
| Resistance to Wetting | (8) |
| Thermal Conductivity/Capacity | (5) |
| Strength | (5) |
| 3. Material ratings | | |
| 3.1 Thermal Shock (×10) | | |
| AT | 10 | (100) |
| FS | 10 | (100) |
| CI | 10 | (100) |
| CB | 6 | (60) |
| LAS | 10 | (100) |
| 3.2 Wettability (×8) | | |
| AT | 10 | (80) |
| FS | 4 | (32) |
| CI | 0 | (0) |
| CB | 10 | (80) |
| LAS | 10 | (80) |
| 3.3 Thermal Conductivity/Capacity (×5) | | |
| AT | 3 | (15) |
| FS | 8 | (40) |
| CI | 0 | (0) |
| CB | 10 | (50) |
| LAS | 10 | (50) |
| 3.4 Strength (×5) | | |
| AT | 10 | (50) |
| FS | 6 | (30) |
| CI | 10 | (50) |
| CB | 2 | (10) |
| LAS | 10 | (50) |
| Total Ratings | | |
| Aluminium Titanate | (AT) (245) = ±9 |
| Fused Silica | (FS) (207) = ±7 |
| Cast Iron | (CI) (150) = ±5 |
| Ceramic Board | (CB) (200) = ±7 |
| Ceramic LAS-product | (LAS) (280) = ±10 |

It is clear from the above results that when used for the handling of molten aluminium, an LAS-ceramic product according to the invention has much better overall properties than those of the aforementioned known products.

It will also be appreciated that there are no doubt many variations in detail possible with a ceramic product according to the invention without departing from the scope of the claims.

What is claimed is:

1. A ceramic product, containing at least 70% lithium aluminum silicate (LAS) of total mass weight percent; and a non-wetting agent in the form of barium sulphate.

2. The ceramic product of claim 1, wherein the lithium aluminum silicate comprises petalite in finely divided form which has been fired to a temperature of between 1150° C. and 1210° C.

3. The ceramic product of claim 2, which comprises 100% lithium aluminum silicate of 100% total mass weight percent.

4. The ceramic product of claim 3, wherein the non-wetting agent in the form of barium sulphate is incorporated in the LAS-ceramic product after being fired.

5. The ceramic product according to any one of the preceding claims having a theoretical density of less than 70%.

6. A method of improving the non-wettability of the ceramic product of any one of claims 1 to 3, which method includes the step of providing the non-wetting agent in the form of barium sulphate in the LAS ceramic product after being fired.

7. The method of claim 6, wherein the barium sulphate is provided in the fired LAS-ceramic product by impregnating the semi-porous fired LAS-ceramic product with a saturated aqueous solution of barium suiphide (BaS) which, after drying, is oxidised in situ to $BaSO_4$.

8. The method of claim 7, wherein the oxidation is effected by calcining the dried product to 500–800° C. in an oxidising atmosphere.

9. The method of claim 6, wherein the BaSO4 is provided by impregnating the semi-porous fired LAS-ceramic product with a solution of $BaCl_2$, and then treating the product with sulphuric acid to cause $BaSO_4$ to precipitate inside the pores of the ceramic product.

10. The method of claim 9, wherein the $BaCl_2$—solution is a substantially saturated one, and the sulphuric acid comprises diluted sulphuric acid.

11. A method of forming the ceramic product of any one of claims 1 to 3, which includes the steps of firing petalite in finely divided form to a temperature of between 1150° C. and 1210° C.; and impregnating the fired product with the non-wetting agent.

12. The method of claim 11, wherein the product is formed by means of any one of the following methods: slip casting; extrusion or injection moulding; wet or dry pressing.

13. The method of claim 11, wherein the finely divided petalite comprises a mixture of two fractions:

- a first one having an average particle size of 1 micrometer, used in a concentration from 50 to 100% (mass per mass); and
- a second one having an average particle size 75 micrometer, used in a concentration of from 0–50% (mass per mass).

* * * * *